(12) United States Patent
Rofougaran et al.

(10) Patent No.: US 8,131,244 B2
(45) Date of Patent: Mar. 6, 2012

(54) METHOD AND SYSTEM FOR DYNAMICALLY ADJUSTING INTERMEDIATE FREQUENCY (IF) AND FILTERING FOR MICROWAVE CIRCUITS

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 971 days.

(21) Appl. No.: 11/954,912

(22) Filed: Dec. 12, 2007

(65) Prior Publication Data

US 2009/0156133 A1 Jun. 18, 2009

(51) Int. Cl.
*H04B 1/26* (2006.01)
(52) U.S. Cl. ........................................ 455/266; 455/307
(58) Field of Classification Search .................... 455/73, 455/76, 82, 83, 84, 87, 91, 114.1–114.3, 455/115, 121, 130, 266, 302, 307, 310, 334
See application file for complete search history.

(56) References Cited

U.S. PATENT DOCUMENTS

| | | | | |
|---|---|---|---|---|
| 6,034,990 A | * | 3/2000 | Kang | 455/83 |
| 6,377,788 B1 | * | 4/2002 | Elder et al. | 455/266 |
| 2007/0123188 A1 | * | 5/2007 | Mo et al. | 455/302 |
| 2008/0026709 A1 | * | 1/2008 | Liu et al. | 455/121 |

* cited by examiner

*Primary Examiner* — Thanh Le
(74) *Attorney, Agent, or Firm* — Farjami & Farjami LLP

(57) ABSTRACT

Certain aspects of a method and system for dynamically adjusting intermediate frequency (IF) and filtering in microwave circuits may include generating one or more intermediate frequency (IF) signals from one or more baseband signals and/or one or more radio frequency (RF) signals. The generated one or more IF signals may be filtered to avoid detected interference and/or detected noise from out-of-band radio sources. The frequency of the generated one or more IF signals may vary depending on the detected interference and/or detected noise. The filtering of the generated one or more IF signals may be adjusted based on the variation in the frequency of the generated one or more IF signals. The one or more RF signals may be down-converted to generate the one or more IF signals. The generated IF signals may be further down-converted and dynamically filtered to generate the desired baseband signals.

23 Claims, 6 Drawing Sheets

METHOD AND SYSTEM FOR DYNAMICALLY ADJUSTING INTERMEDIATE FREQUENCY (IF) AND FILTERING FOR MICROWAVE CIRCUITS

CROSS-REFERENCE TO RELATED APPLICATIONS/INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to wireless communication. More specifically, certain embodiments of the invention relate to a method and system for dynamically adjusting intermediate frequency (IF) and filtering in microwave circuits.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

As the number of electronic devices enabled for wireline and/or mobile communications continues to increase, significant efforts exist with regard to making such devices more power efficient. For example, a large percentage of communications devices are mobile wireless devices and thus often operate on battery power. Additionally, transmit and/or receive circuitry within such mobile wireless devices often account for a significant portion of the power consumed within these devices. Moreover, in some conventional communication systems, transmitters and/or receivers are often power inefficient in comparison to other blocks of the portable communication devices. Accordingly, these transmitters and/or receivers have a significant impact on battery life for these mobile wireless devices.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for dynamically adjusting intermediate frequency (IF) and filtering in microwave circuits, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for dynamically adjusting intermediate frequency (IF) and filtering in microwave circuits. Exemplary aspects of the invention may comprise generating one or more intermediate frequency (IF) signals from one or more baseband signals and/or one or more radio frequency (RF) signals. The generated one or more IF signals may be filtered to avoid detected interference and/or detected noise from out-of-band radio sources. The frequency of the generated one or more IF signals may vary depending on the detected interference and/or detected noise. The filtering of the generated one or more IF signals may be adjusted based on the variation in the frequency of the generated one or more IF signals. The one or more RF signals may be down-converted to generate the one or more IF signals. The generated IF signals may be further down-converted and dynamically filtered to generate the desired baseband signals.

Figure 1:
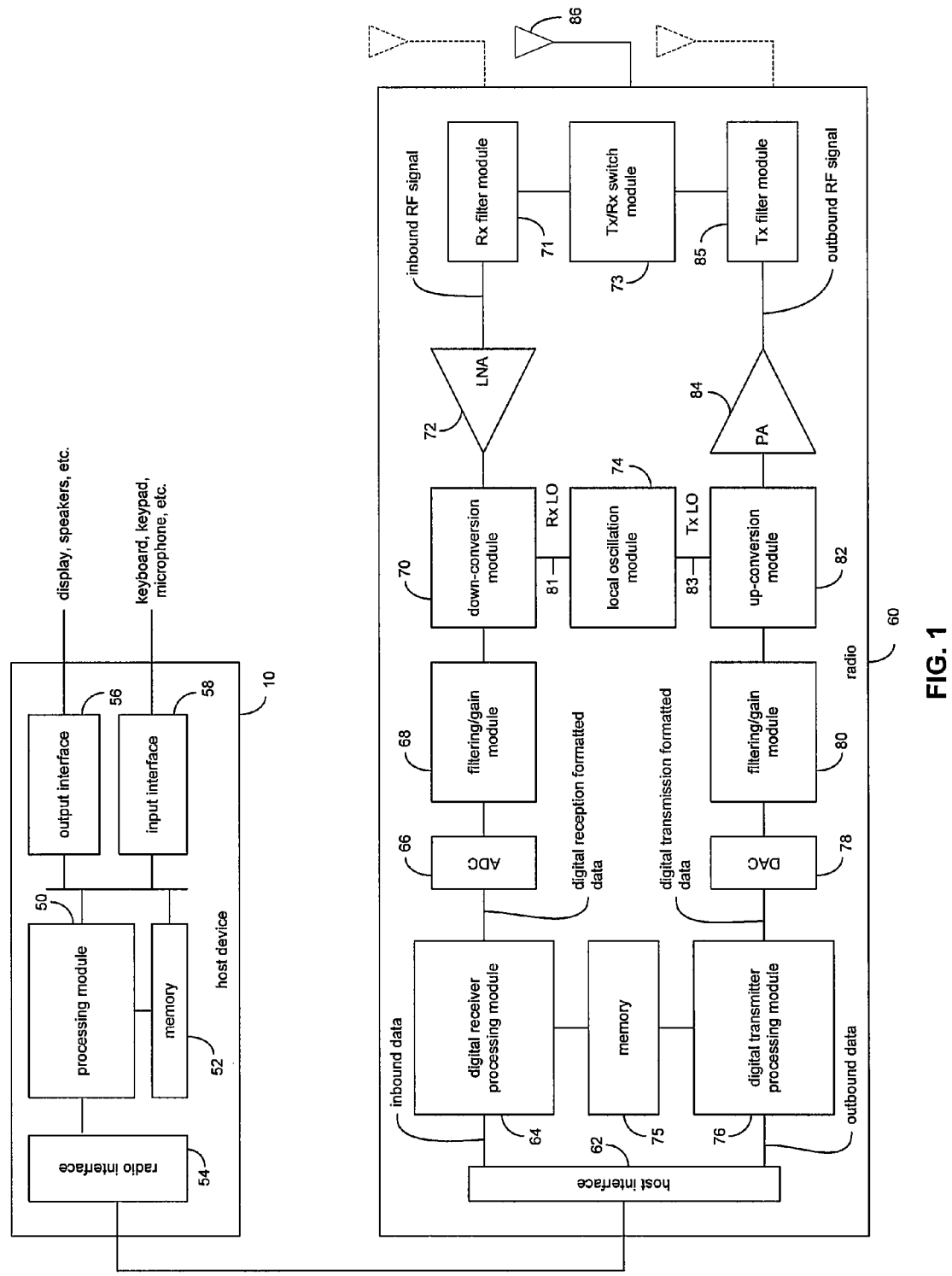
FIG. 1 is a block diagram illustrating an exemplary wireless communication host device and an associated radio, in accordance with an embodiment of the invention.

FIG. 1 is a block diagram illustrating a wireless communication host device and an associated radio, in accordance with an embodiment of the invention. Referring to FIG. 1, there is shown a wireless communication host device 10 and an associated radio 60.

The wireless communication host device 10 may comprise a processing module 50, a memory 52, a radio interface 54, an input interface 58 and an output interface 56. The processing module 50 and the memory 52 may be enabled to execute a plurality of instructions. For example, for a cellular telephone host device, the processing module 50 may be enabled to perform the corresponding communication functions in accordance with a particular cellular telephone standard.

The radio interface 54 may be enabled to allow data to be received from and transmitted to the radio 60. The radio interface 54 may be enabled to provide the data received from the radio 60 to the processing module 50 for further processing and/or routing to the output interface 56. The output interface 56 may be enabled to provide connectivity to an output device such as a display, monitor, or speakers such that the received data may be displayed. The radio interface 54 may be enabled to provide data from the processing module 50 to the radio 60. The processing module 50 may be enabled to receive the outbound data from an input device such as a keyboard, keypad, or microphone via the input interface 58 or generate the data itself. The processing module 50 may be enabled to perform a corresponding host function on the data received via input interface 58 and/or route it to radio 60 via radio interface 54.

For cellular telephone hosts, radio 60 may be a built-in component. For personal digital assistants hosts, laptop hosts, and/or personal computer hosts, the radio 60 may be built-in or an externally coupled component. The radio 60 may comprise a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 may be shared by the transmit and receive paths as regulated by the Tx/Rx switch module 73.

The digital receiver processing module 64 and the digital transmitter processing module 76, in combination with operational instructions stored in the memory 75, may be enabled to execute digital receiver functions and digital transmitter functions, respectively. The digital receiver functions may comprise, but are not limited to, demodulation, constellation demapping, decoding, and/or descrambling. The digital transmitter functions may comprise, but are not limited to, scrambling, encoding, constellation mapping, and modulation. The digital receiver and the transmitter processing modules 64 and 76, respectively, may be implemented using a shared processing device, individual processing devices, or a plurality of processing devices, for example, a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. For example, the memory 75 may be a read-only memory, random access memory, volatile memory, non-volatile memory, static memory, dynamic memory, flash memory, and/or any device that stores digital information. When the digital receiver processing module 64 and/or the digital transmitter processing module 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. The memory 75 may be enabled to store, and digital receiver processing module 64 and/or digital transmitter processing module 76 may be enabled to execute, operational instructions corresponding to at least some of the functions illustrated herein.

In operation, the radio 60 may be enabled to receive outbound data from the wireless communication host device 10 via host interface 62. The host interface 62 may be enabled to route outbound data to the digital transmitter processing module 76. The digital transmitter processing module 76 may be enabled to process the outbound data in accordance with a particular wireless communication standard or protocol, for example, IEEE 802.11a, IEEE 802.11b, and Bluetooth to produce digital transmission formatted data. The digital transmission formatted data may be a digital baseband signal or a digital IF signal, where the IF signal may be in the frequency range of one hundred kilohertz to a few megahertz, for example.

The digital-to-analog converter 78 may be enabled to convert the digital transmission formatted data from the digital domain to the analog domain. The filtering/gain module 80 may be enabled to filter and/or adjusts the gain of the analog baseband signal prior to providing it to the up-conversion module 82. The up-conversion module 82 may be enabled to directly convert the analog baseband signal, or IF signal, into an RF signal based on a transmitter local oscillation 83 provided by the local oscillation module 74. The power amplifier 84 may enable amplification of the RF signal to produce an outbound RF signal, which may be filtered by the transmitter filter module 85. The antenna 86 may be enabled to transmit the outbound RF signal to a targeted device such as a base station, an access point and/or another wireless communication device.

The radio 60 may be enabled to receive an inbound RF signal via antenna 86, which was transmitted by a base station, an access point, or another wireless communication device. The antenna 86 may be enabled to communicate the inbound RF signal to the receiver filter module 71 via Tx/Rx switch module 73, where Rx filter module 71 bandpass filters inbound RF signal. The Rx filter module 71 may be enabled to communicate the filtered RF signal to the low noise amplifier 72, which may amplify the inbound RF signal to generate an amplified inbound RF signal. The low noise amplifier 72 may be enabled to communicate the amplified inbound RF signal to the down-conversion module 70, which may directly convert the amplified inbound RF signal into an inbound low IF signal or baseband signal based on a receiver local oscillation 81 provided by local oscillation module 74. The down-conversion module 70 may be enabled to communicate the inbound low IF signal or baseband signal to the filtering/gain module 68. The filtering/gain module 68 may be enabled to filter and/or attenuate the inbound low IF signal or the inbound baseband signal to produce a filtered inbound signal.

The analog-to-digital converter 66 may be enabled to convert the filtered inbound signal from the analog domain to the digital domain to generate digital reception formatted data. The digital receiver processing module 64 may be enabled to decode, descramble, demap, and/or demodulate digital reception formatted data to recapture inbound data. The host interface 62 may be enabled to communicate the recaptured inbound data to the wireless communication host device 10 via the radio interface 54.

The local oscillation module 74 may be enabled to adjust an output frequency of a received local oscillation signal. The local oscillation module 74 may be enabled to receive a frequency correction input to adjust an output local oscillation signal to generate a frequency corrected local oscillation signal output.

Figure 2:
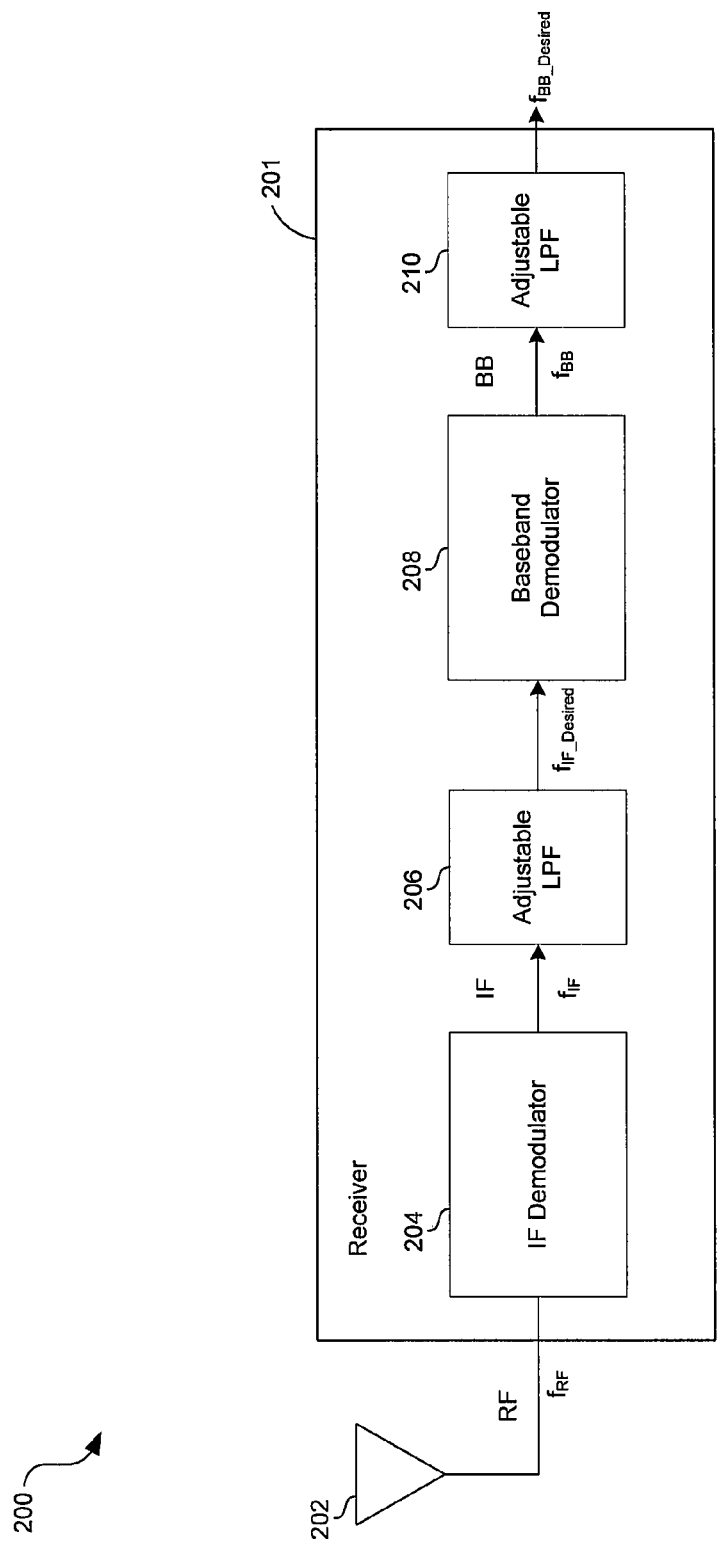
FIG. 2 is a block diagram of an exemplary RF receiver with dynamically adjusting IF and filtering, in accordance with an embodiment of the invention.

FIG. 2 is a block diagram of an exemplary RF receiver with dynamically adjusting IF and filtering, in accordance with an embodiment of the invention. Referring to FIG. 2, there is shown a RF communication system 200. The RF communication system 200 may comprise a receiver 201 and an antenna 202. The receiver 201 may comprise an IF demodulator 204, an adjustable low pass filter (LPF) 206, a baseband demodulator 208 and an adjustable LPF 210.

The antenna 202 may be enabled to receive one or more RF signals $f_{RF}$, for example, 60 GHz signals. The IF demodulator 204 may comprise suitable logic, circuitry and/or code that may be enabled to down-convert the received RF signals to IF signals, $f_{IF}$. The adjustable LPF 206 may be enabled to dynamically adjust the generated IF signal to avoid detected interference and/or detected noise from out-of-band radio sources. The frequency of the generated one or more IF signals may vary depending on the detected interference and/or detected noise. The filtering of the generated one or more IF signals may be adjusted based on the variation in the frequency of the generated one or more IF signals. For example, the adjustable LPF 206 may be enabled to filter the generated IF signal, $f_{IF}$ to generate a desired IF signal, $f_{IF\_Desired}$ to avoid interference from out-of-band radio sources. In this regard, coexistence and noise performance of the wireless system may be improved.

The baseband demodulator 208 may comprise suitable logic, circuitry and/or code that may be enabled to down-convert the filtered IF signal, $f_{IF\_Desired}$ to a baseband signal, $f_{BB}$. The adjustable LPF 210 may be enabled to dynamically adjust the generated baseband (BB) signal, $f_{BB}$ to avoid interference from out-of-band radio sources. For example, the adjustable LPF 210 may be enabled to filter the generated BB signal, $f_{BB}$ to generate a desired BB signal, $f_{BB\_Desired}$ to avoid interference from out-of-band radio sources.

Figure 3:
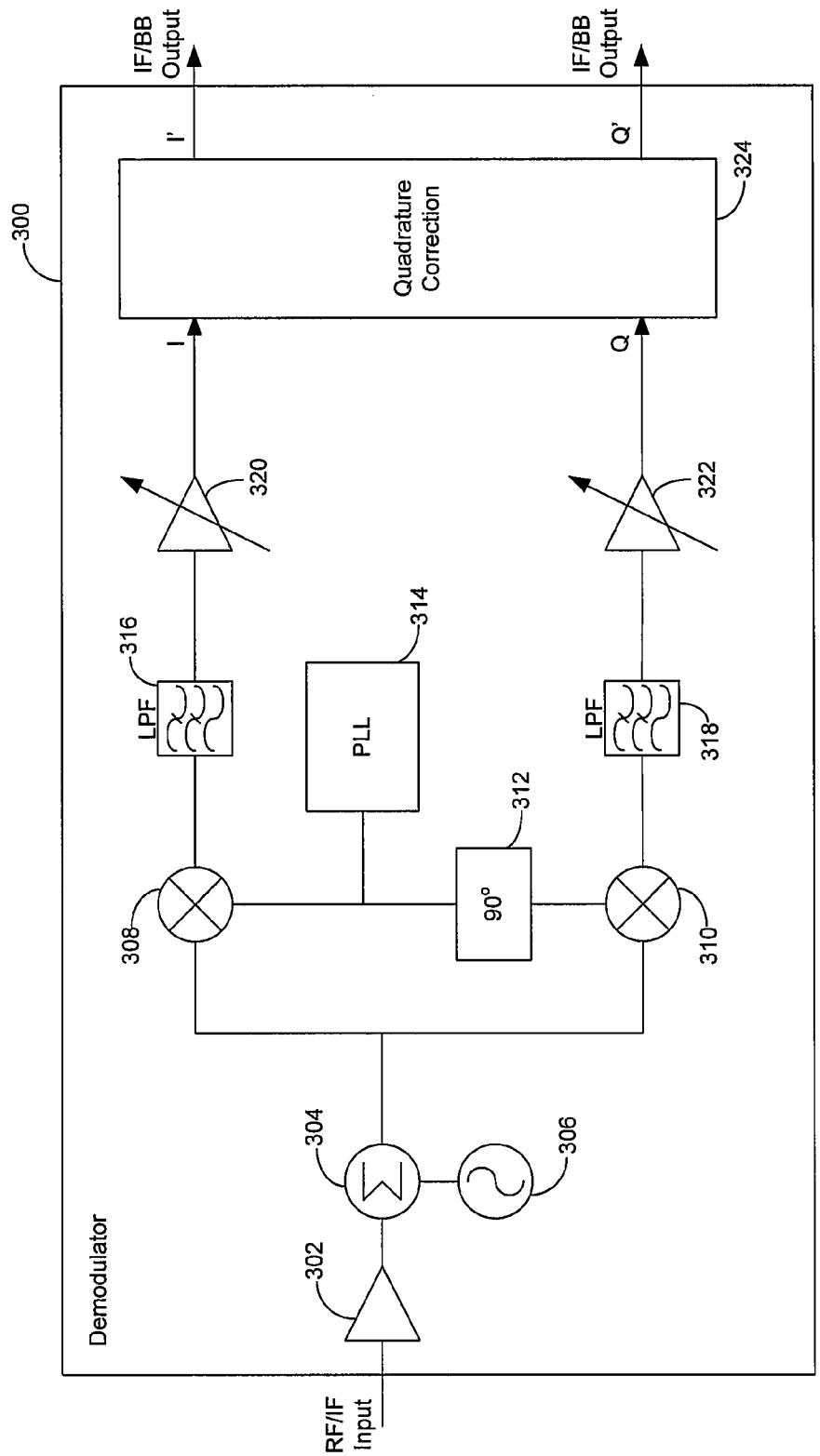
FIG. 3 is a block diagram illustrating an exemplary demodulator, in accordance with an embodiment of the invention.

FIG. 3 is a block diagram illustrating an exemplary demodulator, in accordance with an embodiment of the invention. Referring to FIG. 3, there is shown a demodulator 300. The demodulator 300 may comprise an amplifier 302, a summer 304, an oscillator 306, a plurality of mixers 308 and 310, a plurality of low pass filters 316 and 318, a plurality of linear gain amplifiers 320 and 322, a phase splitter 312, a phase locked loop PLL 314 and a quadrature correction block 324. The demodulator 300 may be similar in functionality to the IF demodulator 204 and/or baseband demodulator 208.

The amplifier 302 may be enabled to receive an input signal and may generate an output signal to the summer 304. The summer 304 may be enabled to receive a plurality of inputs from the amplifier 302 and the oscillator 306 and generate an output signal that may be input to the plurality of mixers 308 and 310. The oscillator 306 may comprise suitable logic and/or circuitry that may be enabled to generate an RF signal slightly different in frequency from the desired input signal that may be utilized to adjust the estimated quadrature error in the I channel and the Q channel of the receiver. The mixers 308 and 310 may be enabled to down-convert the analog RF substreams to baseband. The phase splitter 312 may be enabled to ensure that the mixer local oscillator inputs are 90 degrees out of phase with respect to each other. The phase locked loop 314 may be enabled to drive the mixer local oscillator inputs and the phase splitter 312. The plurality of low pass filters 316 and 318 may be enabled to filter the signals. The plurality of linear gain amplifiers 320 and 322 may be enabled to maintain a constant amplitude and may be controlled by the quadrature correction block 324.

The quadrature correction block 324 may be enabled to receive the I and Q channel inputs. The I and Q channels may be digitized by analog-to-digital converters (ADCs) in the quadrature correction block 324. This has the advantage of permitting arbitrarily accurate measurement and correction of the quadrature errors, limited only by digital precision.

Figure 4:
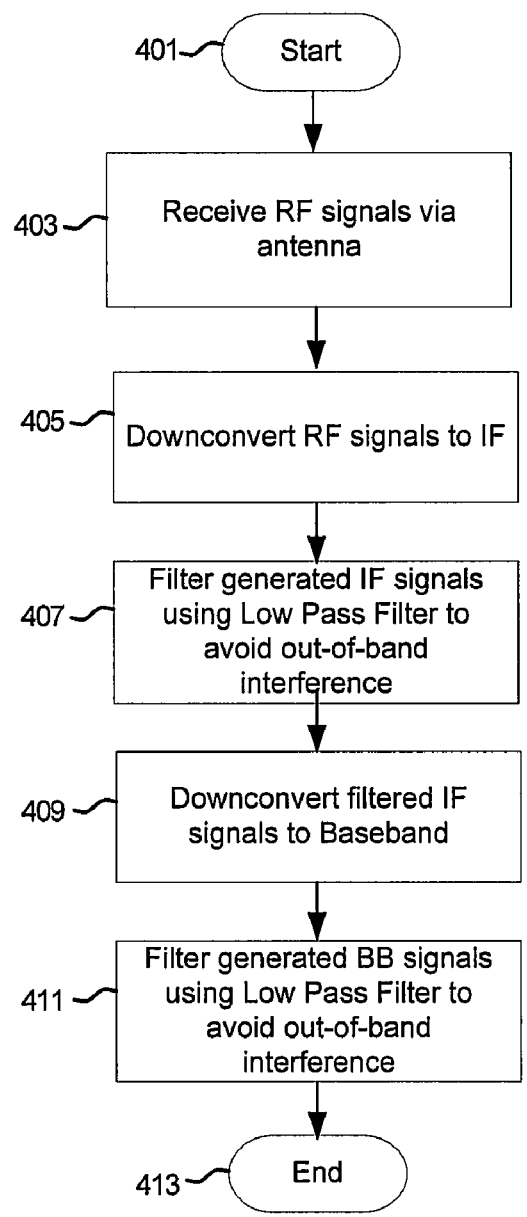
FIG. 4 is a flow chart illustrating exemplary steps for dynamically adjusting IF and filtering in a RF receiver, in accordance with an embodiment of the invention.

FIG. 4 is a flow chart illustrating exemplary steps for dynamically adjusting IF and filtering in a RF receiver, in accordance with an embodiment of the invention. Referring to FIG. 4, exemplary steps may begin at step 401. In step 403, one or more RF signals may be received via an antenna. In step 405, the received RF signals may be down-converted to IF signals. In step 407, the generated IF signals may be filtered to generate a desired IF signal, $f_{IF\_Desired}$ to avoid interference from out-of-band radio sources. In step 409, the filtered IF signal, $f_{IF\_Desired}$ may be down-converted to BB signals. In step 411, the generated BB signals may be filtered to generate a desired BB signal, $f_{BB\_Desired}$ to avoid interference from out-of-band radio sources. Control then passes to end step 413.

Figure 5:
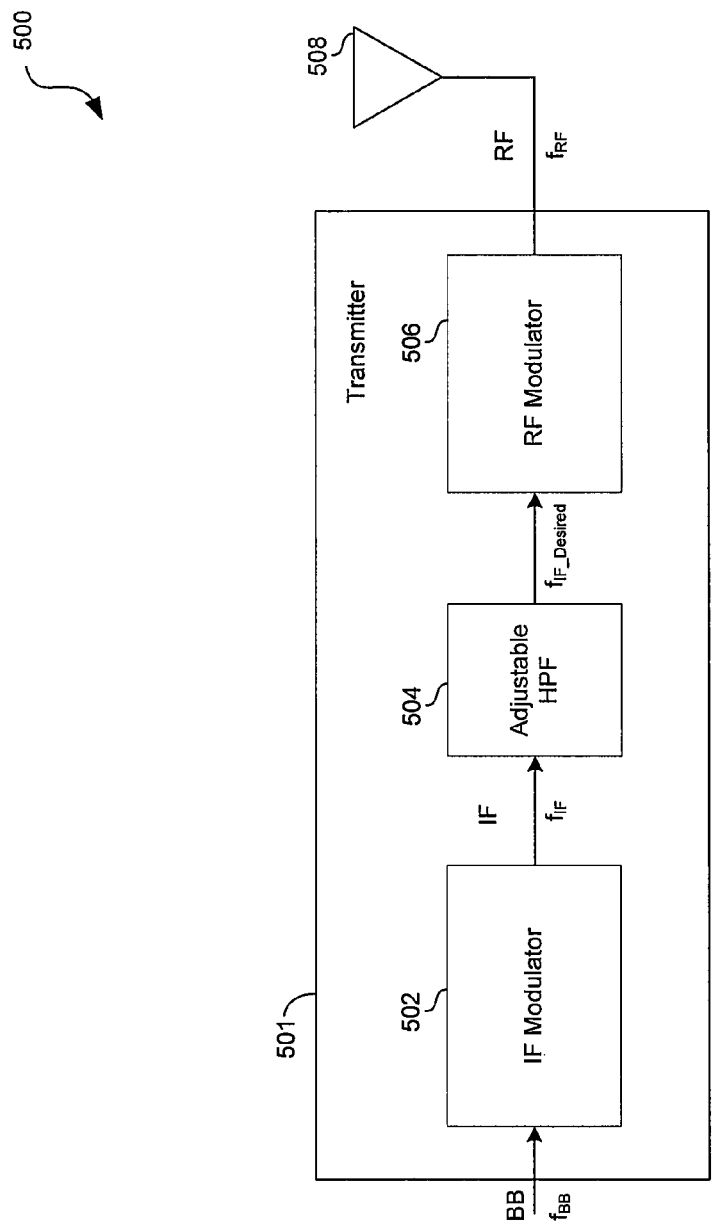
FIG. 5 is a block diagram of an exemplary RF transmitter with dynamically adjusting IF and filtering, in accordance with an embodiment of the invention.

FIG. 5 is a block diagram of an exemplary RF transmitter with dynamically adjusting IF and filtering, in accordance with an embodiment of the invention. Referring to FIG. 5, there is shown a RF communication system 500. The RF communication system 500 may comprise a transmitter 501 and an antenna 508. The transmitter 501 may comprise an IF modulator 502, an adjustable high pass filter (HPF) 504 and an RF modulator 506.

The IF modulator 502 may comprise suitable logic, circuitry and/or code that may be enabled to up-convert the received BB signals, $f_{BB}$ to IF signals, $f_{IF}$. The adjustable HPF 506 may be enabled to dynamically adjust the generated IF signal to avoid interference from out-of-band radio sources. For example, the adjustable HPF 504 may be enabled to filter the generated IF signal, $f_{IF}$ to generate a desired IF signal, $f_{IF\_Desired}$ to avoid interference from out-of-band radio sources.

The RF modulator 506 may comprise suitable logic, circuitry and/or code that may be enabled to up-convert the filtered IF signal, $f_{IF\_Desired}$ to a RF signal, $f_{RF}$. The antenna 508 may be enabled to transmit one or more generated RF signals $f_{RF}$, for example, 60 GHz signals.

Figure 6:
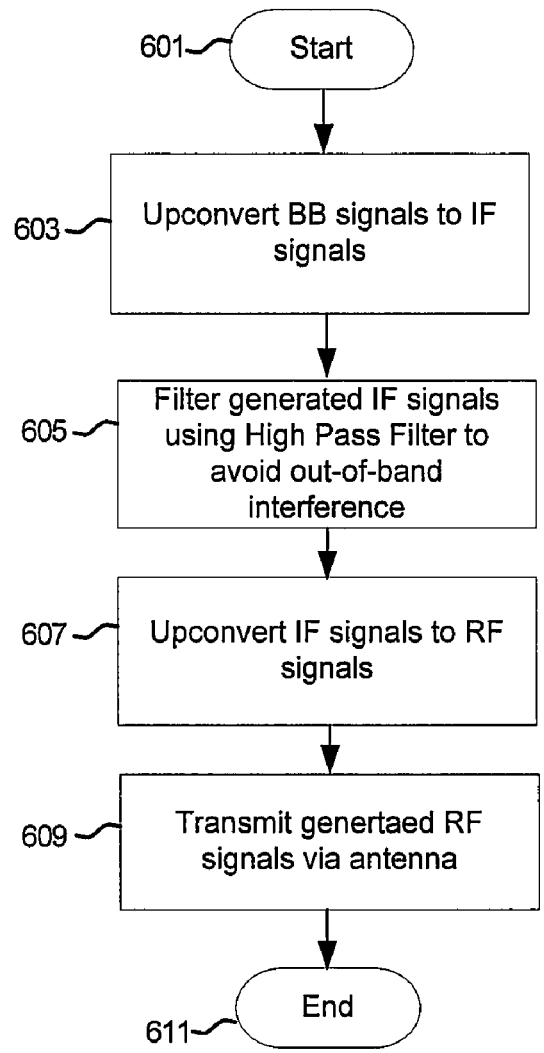
FIG. 6 is a flow chart illustrating exemplary steps for dynamically adjusting IF and filtering in a RF transmitter, in accordance with an embodiment of the invention.

FIG. 6 is a flow chart illustrating exemplary steps for dynamically adjusting IF and filtering in a RF transmitter, in accordance with an embodiment of the invention. Referring to FIG. 6, exemplary steps may begin at step 601. In step 603, one or more BB signals may be up-converted to IF signals. In step 605, the generated IF signals may be filtered using a high pass filter to generate a desired IF signal, $f_{IF}$ Desired to avoid interference from out-of-band radio sources. In step 607, the filtered IF signal, $f_{IF\_Desired}$ may be up-converted to RF signals. In step 609, the generated RF signals may be transmitted via an antenna. Control then passes to end step 611.

In accordance with an embodiment of the invention, a method and system for dynamically adjusting intermediate frequency (IF) and filtering in microwave circuits may comprise generating one or more intermediate frequency (IF) signals from one or more baseband signals and/or one or more radio frequency (RF) signals. The generated one or more IF signals may be filtered to avoid detected interference and/or detected noise from out-of-band radio sources. The frequency of the generated one or more IF signals may vary depending on the detected interference and/or detected noise. The filtering of the generated one or more IF signals may be adjusted based on the variation in the frequency of the generated one or more IF signals. In this regard, coexistence and noise performance of the wireless system may be improved.

The antenna 202 may be enabled to receive one or more RF signals. The IF demodulator 204 may be enabled to down-convert the received one or more RF signals, $f_{RF}$ to generate the one or more IF signals, $f_{IF}$. The adjustable LPF 206 may be enabled to dynamically low pass filter the generated IF signals, $f_{IF}$ to avoid interference from out-of-band radio sources by generating a desired IF signal, $f_{IF\_Desired}$. The baseband demodulator 208 may be enabled to down-convert the dynamically low pass filtered generated one or more IF signals, $f_{IF\_Desired}$ to generate one or more baseband signals, $f_{BB}$. The adjustable LPF 210 may be enabled to dynamically low pass filter the generated baseband signals, $f_{BB}$ to avoid interference from out-of-band radio sources by generating a desired BB signal, $f_{BB\_Desired}$.

The IF modulator 502 may be enabled to up-convert one or more baseband signals, $f_{BB}$ to generate one or more IF signals, $f_{IF}$. The adjustable HPF 504 may be enabled to dynamically high pass filter the generated IF signals, $f_{IF}$ to avoid interference from out-of-band radio sources by generating a desired IF signal, $f_{IF\_Desired}$. The RF modulator 506 may be enabled to up-convert the dynamically high pass filtered, generated one or more IF signals, $f_{IF\_Desired}$ to generate one or more RF signals, $f_{RF}$. The antenna 508 may be enabled to transmit the generated one or more RF signals, $f_{RF}$.

Certain embodiments of the invention may comprise a machine-readable storage having stored thereon, a computer program having at least one code section for dynamically adjusting intermediate frequency (IF) and filtering in microwave circuits, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
   in a receiver capable of handling one or more radio frequency (RF) signals in a 60 GHz frequency band:
      generating one or more intermediate frequency (IF) signals from said one or more RF signals;
      filtering said generated one or more IF signals;
      generating one or more baseband signals from said generated one or more filtered IF signals; and
      filtering said generated one or more baseband signals, wherein:
         a frequency of said generated one or more filtered baseband signals and a frequency of said generated one or more filtered IF signals varies depending on a detected interference and a detected noise; and
         said detected interference and said detected noise are generated from out-of-band radio sources.

2. The method according to claim 1, comprising adjusting said filtering based on said variation in said frequency of said generated one or more IF signals.

3. The method according to claim 1, comprising down-converting said one or more RF signals to generate said one or more IF signals.

4. The method according to claim 3, comprising dynamically low pass filtering said generated one or more IF signals to at least reduce said detected interference and/or said detected noise from said out-of-band radio sources.

5. The method according to claim 4, comprising down-converting said dynamically low pass filtered said generated one or more IF signals to generate said one or more baseband signals.

6. The method according to claim 5, comprising dynamically low pass filtering said generated one or more baseband signals to at least reduce said detected interference and/or said detected noise from said out-of-band radio sources.

7. The method according to claim 1, comprising up-converting said one or more baseband signals to generate said one or more IF signals.

8. The method according to claim 7, comprising dynamically high pass filtering said generated one or more IF signals to at least reduce said detected interference and/or said detected noise from said out-of-band radio sources.

9. The method according to claim 8, comprising up-converting said dynamically high pass filtered said generated one or more IF signals to generate said one or more RF signals.

10. The method according to claim 9, comprising transmitting said generated one or more RF signals via an antenna.

11. The method according to claim 1, comprising receiving said one or more RF signals via an antenna.

12. A system for wireless communication, the system comprising:
   one or more circuits for use in a receiver capable of handling one or more radio frequency (RF) signals in a 60 GHz frequency band, said one or more circuits being operable to:
      generate one or more intermediate frequency (IF) signals from said one or more RF signals;
      filter said generated one or more IF signals;
      generate one or more baseband signals from said generated one or more filtered IF signals; and
      filter said generated one or more baseband signals, wherein:

a frequency of said generated one or more filtered baseband signals and a frequency of said generated one or more filtered IF signals varies depending on a detected interference and a detected noise; and said detected interference and said detected noise are generated from out-of-band radio sources.

13. The system according to claim 12, wherein said one or more circuits are operable to adjust said filtering based on said variation in said frequency of said generated one or more IF signals.

14. The system according to claim 13, wherein said one or more circuits are operable to down-convert said one or more RF signals to generate said one or more IF signals.

15. The system according to claim 14, wherein said one or more circuits are operable to dynamically low pass filter said generated one or more IF signals to at least reduce said detected interference and/or said detected noise from said out-of-band radio sources.

16. The system according to claim 15, wherein said one or more circuits are operable to down-convert said dynamically low pass filtered said generated one or more IF signals to generate said one or more baseband signals.

17. The system according to claim 16, wherein said one or more circuits are operable to dynamically low pass filter said generated one or more baseband signals to at least reduce said detected interference and/or said detected noise from said out-of-band radio sources.

18. The system according to claim 12, wherein said one or more circuits are operable to up-convert said one or more baseband signals to generate said one or more IF signals.

19. The system according to claim 18, wherein said one or more circuits are operable to dynamically high pass filter said generated one or more IF signals to at least reduce said detected interference and/or said detected noise from said out-of-band radio sources.

20. The system according to claim 19, wherein said one or more circuits are operable to up-convert said dynamically high pass filtered said generated one or more IF signals to generate said one or more RF signals.

21. The system according to claim 20, wherein said one or more circuits are operable to transmit said generated one or more RF signals via an antenna.

22. The system according to claim 12, wherein said one or more circuits are operable to receive said one or more RF signals via an antenna.

23. A method for wireless communication, the method comprising:

in a transmitter capable of handling one or more radio frequency (RF) signals in a 60 GHz frequency band:

generating one or more intermediate frequency (IF) signals from one or more baseband signals;

filtering said generated one or more IF signals; and generating said one or more RF signals from said generated one or more filtered IF signals, wherein:

a frequency of said generated one or more filtered IF signals varies depending on a detected interference and a detected noise; and said detected interference and said detected noise are generated from out-of-band radio sources.

\* \* \* \* \*